…

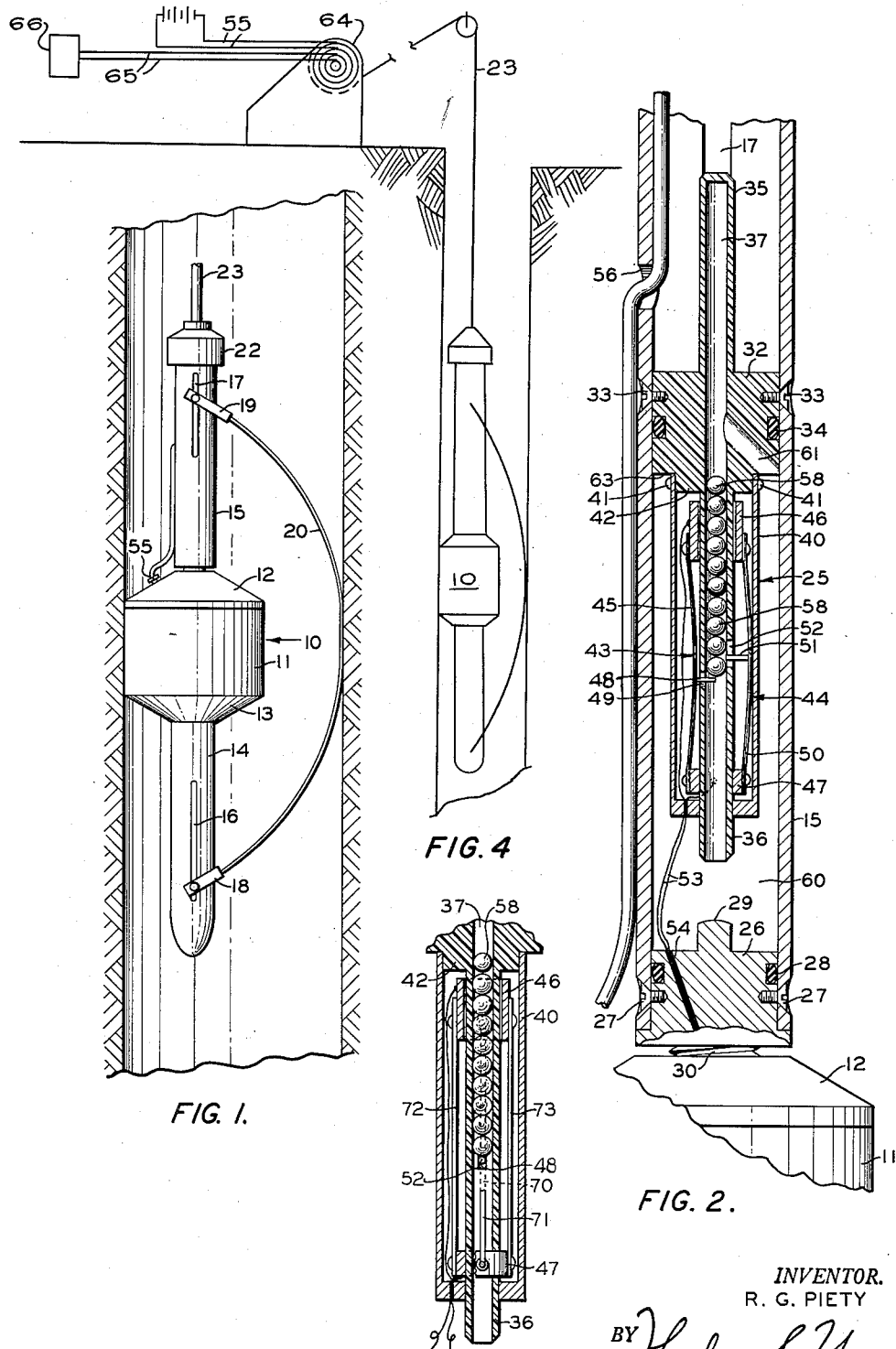

United States Patent Office 2,729,094
Patented Jan. 3, 1956

2,729,094

APPARATUS FOR TESTING SEISMOMETERS

Raymond G. Piety, Bartlesville, Okla., assignor to Phillips Petroleum Company, a corporation of Delaware Application September 15, 1950, Serial No. 185,054

9 Claims. (Cl. 73—1)

This invention relates to apparatus for testing seismometers or other devices responsive to mechanical impulses.

In seismic prospecting, an explosive charge is detonated at a shot point to produce seismic waves, a portion of which traverse the surfaces of the earth and another portion of which are reflected and refracted from subterranean strata. These seismic waves are picked up at a number of locations spaced from the shot point by seismometers which produce electrical voltages representative of the seismic waves. These electrical voltages from the seismometers are fed to a common recording station where valuable information is obtained concerning the subterranean strata from the data shown on the recorder chart.

In many cases, it is undesirable to position the seismometers in the surface or "weathered" layer. This results from the fact that the surface waves, which do not yield information concerning subterranean strata, are more easily picked up by a seismometer positioned at the surface and, moreover, the transmission characteristics of the surface layer are non-uniform to a greater extent than the deeper formations. Accordingly, a drill hole, which may range in depth from ten feet to several hundred feet, is drilled and the seismometer is positioned within this drill hole before the explosive charge is detonated. The seismometer is a very delicate instrument and inaccurate results are obtained if it is not firmly planted, that is, if the seismometer does not make direct and intimate contact with the earth at the region where the seismometer waves are to be received. Heretofore, only the crudest tests have been devised to determine whether the seismometers are, in fact, properly planted and it may be presumed that inaccurate results have been obtained in many seismic prospecting operations due to improper planting of the seismometers.

It is an object of this invention to provide a device for testing the secureness with which a seismometer is planted in a drill hole.

It is a further object to provide novel apparatus for providing mechanical excitations of a predetermined magnitude to a vibration or impact responsive device to test the same.

It is a still further object to provide a device wherein a series of impacts can be produced at controlled times at a remote or inaccessible location.

It is a still further object to provide a novel apparatus for testing the firmness with which a seismometer is planted.

It is a still further object to provide an apparatus whereby a device is subjected to repeated impacts of known magnitude.

Various other objects, advantages and features of the invention will become apparent from the following detailed description taken in conjunction with the accompanying drawings, in which:

Figure 1 is a front elevational view of a seismometer with a planting device incorporating the apparatus of this invention;

Figure 2 is a vertical sectional view of the impact-producing device;

Figure 3 is a vertical sectional view of a modification of the invention wherein the structure is rotated through an angle of 90° about its axis with respect to the structure of Figure 2; and Figure 4 is a vertical sectional view of a seismometer with a planting device illustrating the above-ground installation.

Referring now to Figure 1, I have shown a seismometer 10 mounted within a generally cylindrical metal casing 11 having a detachable sealed cover 12 at the top portion thereof and a taper integrally formed bottom portion 13 carrying a downwardly protruding cylindrical support 14. A generally similar cylindrical support 15 is secured to the upper part of the cover 12 in a manner to be hereinafter described, supports 14 and 15 being provided with slots 16 and 17, respectively, which are adapted to receive clevis members 18 and 19, respectively, secured to a strong bowed leaf spring 20. Positioned at the top of support 15 is a coupling member 22 of conventional construction to attach the seismometer structure to a cable 23. When the described structure is lowered into a drill hole, as by a string of metal rods, the spring 20 causes the seismometer casing 11 to be firmly pressed against a sidewall of the drill hole, thereby to firmly plant the seismometer in desired position therein, the pressure being sufficient that seismic waves traversing the subterranean strata are readily transmitted through the casing to the transducer therein. Should the seismometer be improperly planted due, for example, to irregularities in the sides of the drill hole, it will be evident that the structure is not firmly planted and that the transmission of seismic waves from the earth through the casing 11 to the seismometer proper will be interfered with.

In order to determine whether or not the seismometer is properly planted, I provide a device 25 for producing impacts of controlled magnitude at preselected times, these impulses being transmitted to the seismometer casing by the apparatus now to be described. Referring to Figure 2, it will be noted that the cylindrical support 15 has, at its lower end, a cylindrical plug 26 secured to the support by screws 27, this plug being provided with an annular recess carrying a sealing gasket 28 to seal the lower end of the support. A cylindrical boss or anvil 29 protrudes upwardly from the center of plug 26 and, at its lower end, the plug has a screw threaded central extension 30 which fits into a complementary threaded recess, not shown, in the seismometer cover 12. In this manner, the support 15 is attached to the seismometer cover and impacts produced at anvil 29 produce vibrations which pass through plug 26, the extension 30 and the cover 12 to the seismometer to produce an electrical impulse. Mounted within the cylindrical support 15 above plug 26 is a second plug 32 which is secured to the support by screws 33 and has an annular recess within which is mounted a sealing gasket 34. The plug 32 has a central longitudinal bore which cooperates with an extension 35 above the plug and an extension 36 below the plug to form an axial tube 37.

An enlarged cylindrical housing 40 is secured by screws 41 to a boss 42 depending from plug 32, this housing having a pair of electrical actuated devices or release mechanism 43 and 44 mounted therein. The device 43 includes a bowed spring 45 of electrically conductive expansible material having one end thereof secured to a cylindrical support 46 mounted on the tube extension 36 just below plug 32, the other end of the spring 45 being secured to a cylindrical support 47 mounted at the lower end of housing 40. The spring 45 carries a pin or stop 48 which normally protrudes through a slot 49 in tube extension 36 to approximately the center of the tube. The device 44 includes a bowed spring 50 of electrically conductive expansible material which has its ends secured to the supports 46, 47 and carries a pin or stop 51 which extends into a slot 52 in the tube extension 36 but is normally spaced radially outward from the tube proper. Electrical heating current is supplied, when desired, to the conductive springs 45, 50 by leads 53, one of which is connected to support 47 and the other of which is connected to support 46. The leads extend through a slot 54 in plug 26 and its threaded extension 30 to the interior of the seismometer casing. Thence, the leads 53 together with the conductors attached to the seismometer coil extend through a cable-anchoring and connecting device 55 in cover 12 to an opening 56 in support 15 whence they pass inwardly of the support and are connected through the device 22 to the cable 23. As shown in Figure 4, the electrical heating current referred to above may be supplied by a battery which through leads 55 is connected to cable 23. Cable 23 is wound on windlass 64, and the connection between cable 23 and leads 55 is effected by slip rings and brushes as shown.

In accordance with the invention, a plurality of balls 58 or other impact-producing objects are positioned within the tube 37 a predetermined distance above anvil 29 and the seismometer. These balls are normally prevented from dropping out of the tube by the stop 48. When it is desired to test the firmness with which the seismometer is planted after it has been lowered into the drill hole to the desired depth, electrical current is supplied to conductors 53, and the bowed springs 45, 50 expand with the result that stop 48 moves radially outward from the tube and stop 51 moves radially inward. As a result, the lowermost ball 58 is released and is directed by the tube portion 36 against the anvil 29, thereby producing a mechanical impulse which is transmitted through plug 26 and extension 30 to the seismometer. If the seismometer is properly planted, a pure wave of approximately sinusoidal form will be produced by the seismometer responsive to the mechanical impact by the ball whereas, if the seismometer is not properly planted, an irregular wave or "hash" will appear upon the record rather than an approximately sinusoidal wave. As shown in Figure 4, the output of the seismometer is supplied through cable 23 to a graphic recording device 66 which includes a tuned amplifier in order to transcribe on a moving tape a graphic representation of the voltage fluctuations. The recording device which may be utilized is well known and common in the art. In this fashion, the manner in which the seismometer is planted can be readily determined by measuring, indicating or recording the seismometer output. It will be noted that stop 51 moves inwardly at the same time stop 48 moves radially outward, the stop 51 thus preventing all of the balls 58 except the lowermost one from falling through the tube. When the current supply to conductors 53 is interrupted, stop 48 moves radially inward into tube 37 and stop 51 moves outwardly. This permits the lowermost remaining ball to move downwardly into engagement with stop 48 whereupon the testing device is again ready for actuation by a supply of current to the springs 45 and 50.

It will be noted, therefore, that all the balls in the tube may be successively dropped upon the anvil 29 by selective electrical actuation of the springs 45 and 50, each ball dropping upon the anvil with uniform force determined by the height of stop 48 above the anvil, furthermore, the device is actuatable from a remote location and produces a reproduceable impact upon the seismometer whenever it is actuated.

It will be noted that the plug 26 and cylindrical support 15 define a chamber 60 for receiving the balls 58 after they have been dropped through the tube 37. After all or a predetermined number of balls have entered the chamber in this manner, they may be returned to the tube merely by tilting the support 15, thus allowing the balls to pass through the space between housing 40 and support 15 to a bore 61 formed in the plug 32, this bore communicating with a portion of the tube spaced upwardly from the lower end portion 36. Accordingly, it is not necessary to remove the structure from support 15 each time it is desired to refill the tube or magazine 37 with the balls 58. To facilitate passage of the balls from chamber 60 back into the tube 37, the lower face 63 of plug 32 is so shaped as to direct the balls into bore 61 when the support 15 is inverted.

In the modification of the invention shown by Figure 3 parts similar to those of Figures 1 and 2 are indicated by like reference characters. In this modification, the bowed springs 70 and 71 are not necessarily of electrically conductive material, although they function mechanically in the same manner as the springs of Figure 2 upon relative movement of the supports 46 and 47. This relative movement is effected by electrically-conductive expansible wires 72 and 73 which, upon expansion, permit the members 46, 47 to move away from each other responsive to the action of the springs 70 and 71, thus moving the lower stop 48 out of the tube and moving the upper stop 51 into the tube to permit the lowermost ball to drop. When the wires are cooled by interruption of the current passing therethrough, the wires 72, 73 contract with the result that supports 46, 47 move toward each other, the lower stop 48 moving into the tube and the upper stop 51 moving out of the tube. As a result, the ball previously held by upper stop 51 drops into the lowermost position shown in the figure and engages the lower stop 48. The operation of this modification is similar, in all respects to the operation of the unit of Figures 1 and 2.

It will be evident that the device of my invention is not restricted to the testing of seismometer planting but is useful in any application where a series of uniform impacts are desired at preselected times. The use of this apparatus with a seismometer in a drill hole, however, is believed to constitute a new method of seismometer testing.

In some cases, the actuation of the ball dropping mechanism could be effected magnetically, where it is of particular importance to avoid electrical conduction effects.

While the invention has been described in connection with present, preferred embodiments thereof, it is to be understood that this description is illustrative only and is not intended to limit the invention, the scope of which is defined by the appended claims.

I claim:

1. In an apparatus for testing a seismometer the combination of a planting device secured to said seismometer, said planting device incorporating a tube for holding a plurality of impact-producing balls, an electrically actuated release mechanism to permit said balls to leave said tube successively to strike and produce impacts upon said seismometer, means for collecting the balls leaving said tube, and means responsive to tilting of said device to return the balls to said tube.

2. In an apparatus for testing a seismometer the combination of a testing device secured to said seismometer, said device including a tube, a plurality of balls therein, an anvil mechanically connected to said seismometer to transmit mechanical excitation impulses thereto, said tube being arranged to permit said balls to drop from one end thereof upon said anvil, a first stop normally extending into said tube, a second stop normally spaced radially from said tube and longitudinally from said first stop, and means for moving said first stop out of said tube and for moving said second stop radially into said tube.

3. In an apparatus for testing a seismometer the combination of a testing device secured to said seismometer, said device including a tube, a plurality of balls therein, an anvil mechanically connected to said seismometer to transmit mechanical excitation impulses thereto, said tube being arranged to permit said balls to drop from one end thereof upon said anvil, a bowed spring of electrically conductive expansible material, a stop fixed to said spring normally extending into said tube, a second bowed spring of electrically conductive expansible material, a second stop fixed to said second spring and normally spaced radially from said tube and longitudinally from said first stop, and means for supplying electrical current to heat said springs, thereby to move said first stop out of said tube and to move said second stop radially into said tube.

4. In an apparatus for testing a seismometer the combination of a testing device secured to said seismometer, said device including a tube, a plurality of balls therein, an anvil mechanically connected to said seismometer to transmit mechanical excitation impulses thereto, said tube being arranged to permit said balls to drop from one end thereof upon said anvil, means defining a chamber adjacent said anvil to receive balls dropped from said tube, a passageway connecting said chamber with a portion of said tube spaced from said one end thereof to permit said balls to pass from said chamber to said tube, a bowed spring of electrically conductive expansible material, a stop fixed to said spring normally extending into said tube, a second bowed spring of electrically conductive expansible material, a second stop fixed to said second spring and normally spaced radially from said tube and longitudinally from said first stop, and means for supplying electrical current to heat said springs, thereby to move said first stop out of said tube and to move said second stop radially into said tube.

5. Testing apparatus which comprises, in combination, a tube, a plurality of balls therein, an impact responsive surface, said tube being arranged to permit said balls to be directed from one end thereof upon said surface, a bowed spring of electrically conductive expansible material, a stop fixed to said spring normally extending into said tube, a second bowed spring of electrically conductive expansible material, a second stop fixed to said second spring and normally spaced radially from said tube and longitudinally from said first stop, and means for supplying electrical current to heat said springs, thereby to move said first stop out of said tube and to move said second stop radially into said tube.

6. Testing apparatus which comprises, in combination, a tube, a plurality of balls therein, an impact-responsive surface, said tube being arranged to permit said balls to drop from one end thereof upon said surface, means defining a chamber adjacent said surface to receive balls dropped from said tube, a passageway connecting said chamber with a portion of said tube spaced from said one end thereof to permit said balls to pass from said chamber to said tube, a bowed spring of electrically conductive expansible material, a stop fixed to said spring normally extending into said tube, a second bowed spring of electrically conductive expansible material, a second stop fixed to said second spring and normally spaced radially from said tube and longitudinally from said first stop, and means for supplying electrical current to heat said springs, thereby to move said first stop out of said tube and to move said second stop radially into said tube.

7. Testing apparatus which comprises, in combination, a tube, a plurality of balls therein, an impact-responsive surface, said tube being arranged to permit said balls to drop from one end thereof upon said surface, means defining a chamber adjacent said surface to receive balls dropped from said tube, a passageway connecting said chamber with a portion of said tube spaced from said one end thereof to permit said balls to pass from said chamber to said tube, a pair of supports movable longitudinally toward and away from each other upon said tube, an inwardly bowed spring and an outwardly bowed spring each carried by said supports, a stop on each spring adapted to move into and out of said tube, an expansible, electrically conductive wire having one end thereof mounted on each support, and means for heating said wire to cause expansion thereof thereby to permit said springs to move said supports away from each other whereby one stop moves into the tube and the other stop moves out of the tube.

8. In an apparatus for testing a seismometer the combination of a planting device secured to said seismometer, said planting device incorporating means for positioning an impact-producing object a predetermined distance from said seismometer, and means for causing said object to strike and produce impacts upon said seismometer.

9. In an apparatus for testing a seismometer the combination of a planting device secured to said seismometer, said planting device incorporating a magazine for holding a plurality of impact-producing objects, and an electrically actuated release mechanism to permit said objects to leave said magazine successively to strike and produce impacts upon said seismometer.

References Cited in the file of this patent
UNITED STATES PATENTS

| | | |
|---|---|---|
| 862,923 | Linsley | Aug. 13, 1907 |
| 2,264,412 | Shindel | Dec. 2, 1941 |
| 2,281,324 | Preston | Apr. 28, 1942 |
| 2,428,168 | Loper | Sept. 30, 1947 |
| 2,539,418 | Grogan | Jan. 30, 1951 |